Nov. 29, 1938.  J. W. BRYCE ET AL  2,138,337
ACCOUNTING MACHINE
Filed Jan. 24, 1930  15 Sheets-Sheet 6

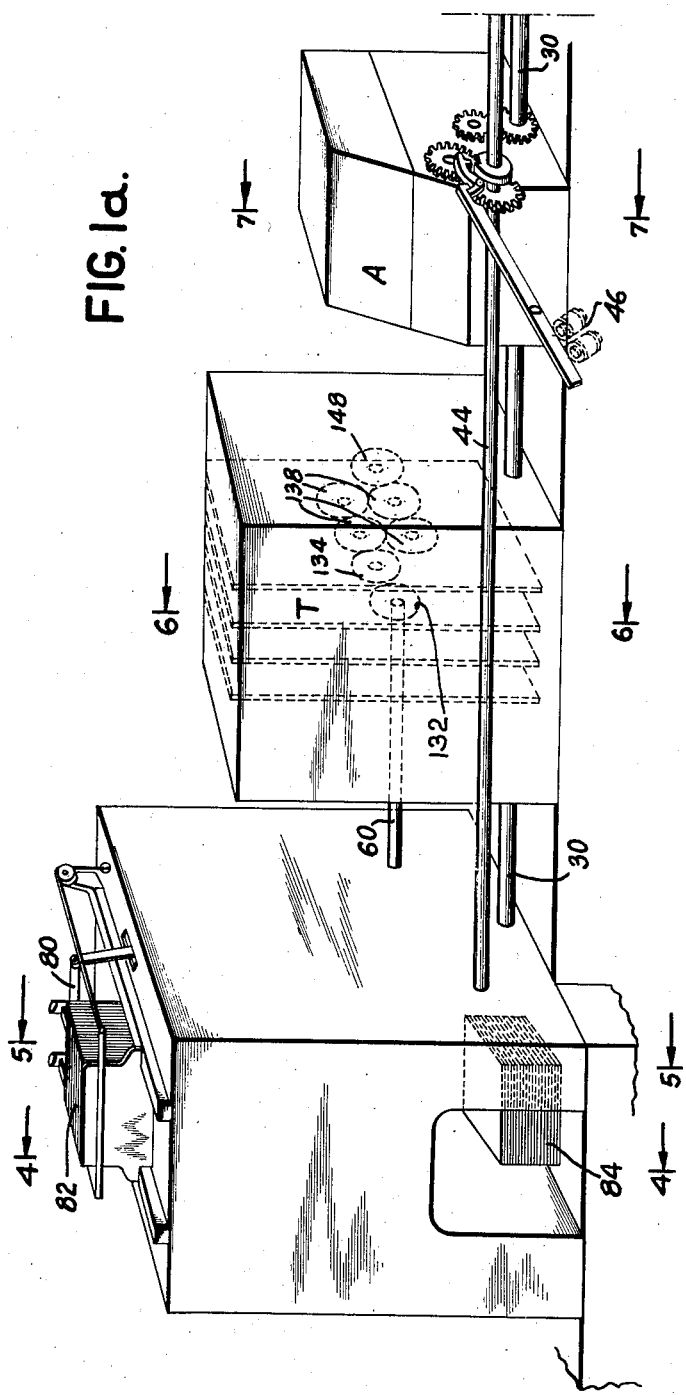

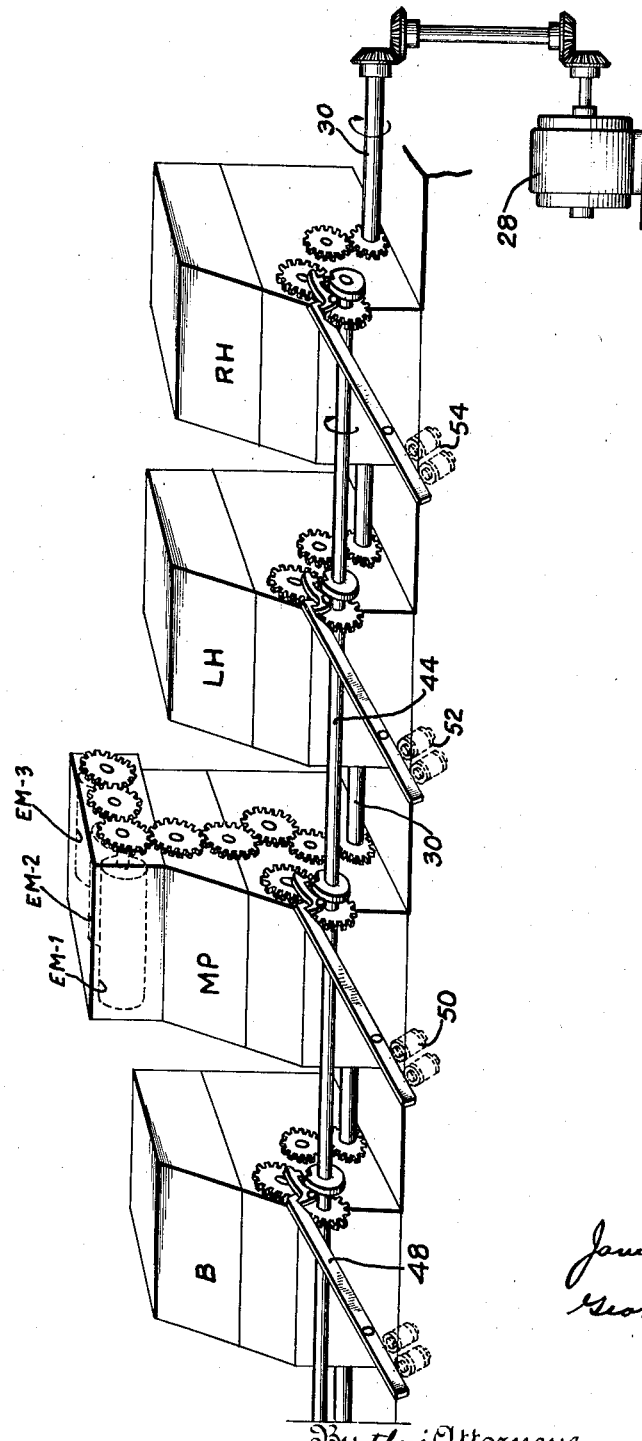

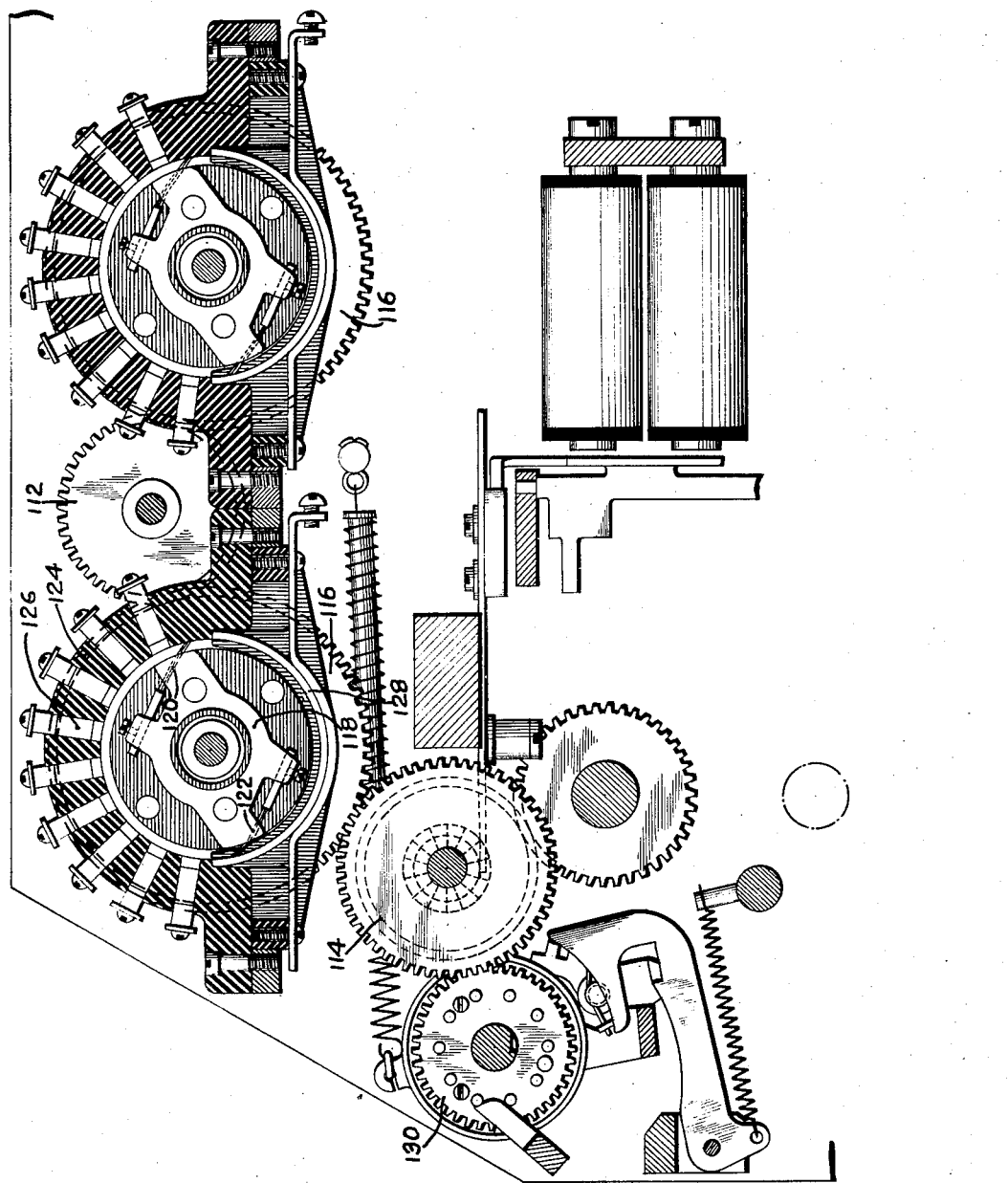

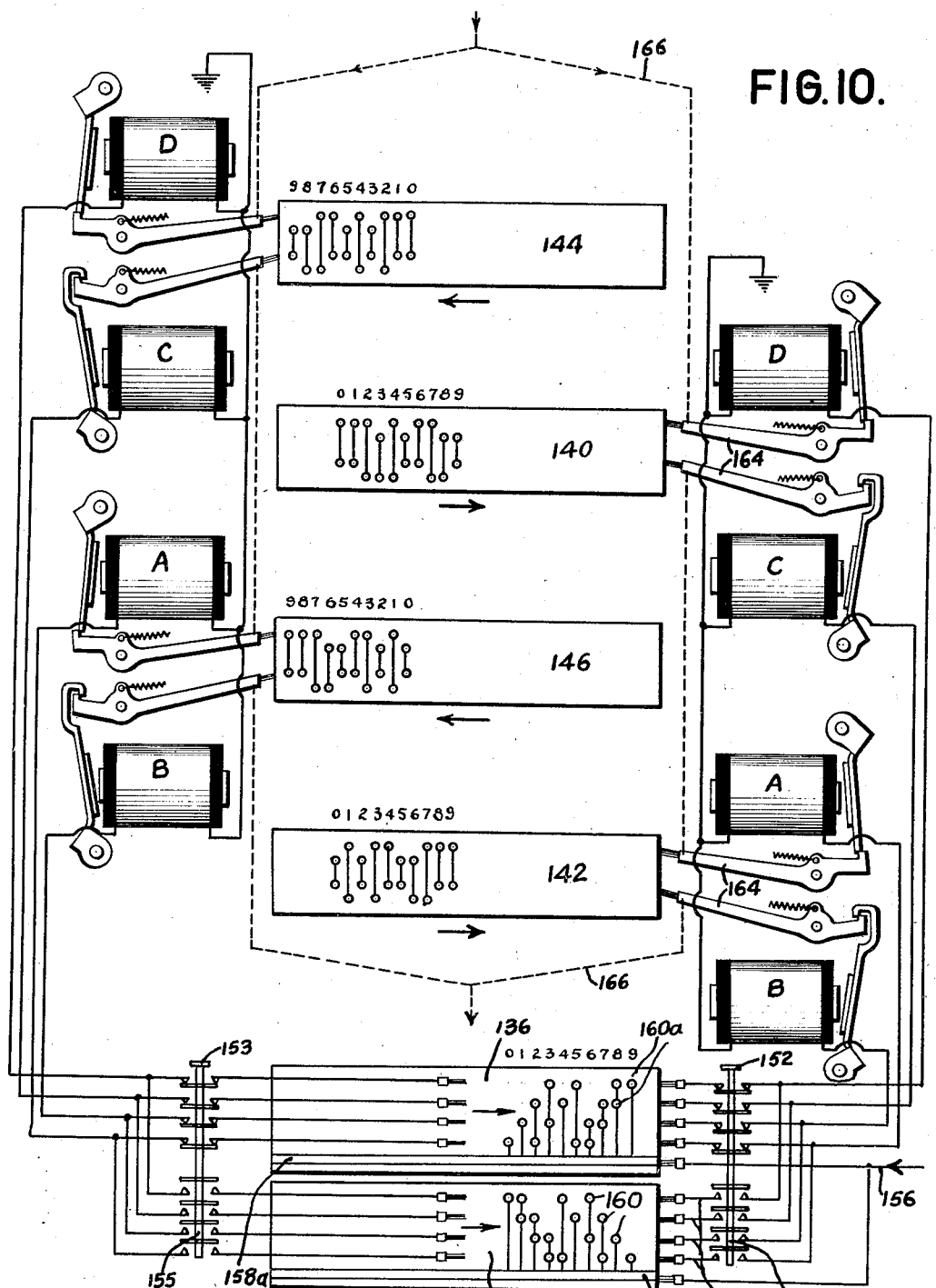

Nov. 29, 1938.  J. W. BRYCE ET AL  2,138,337
ACCOUNTING MACHINE
Filed Jan. 24, 1930   15 Sheets-Sheet 10

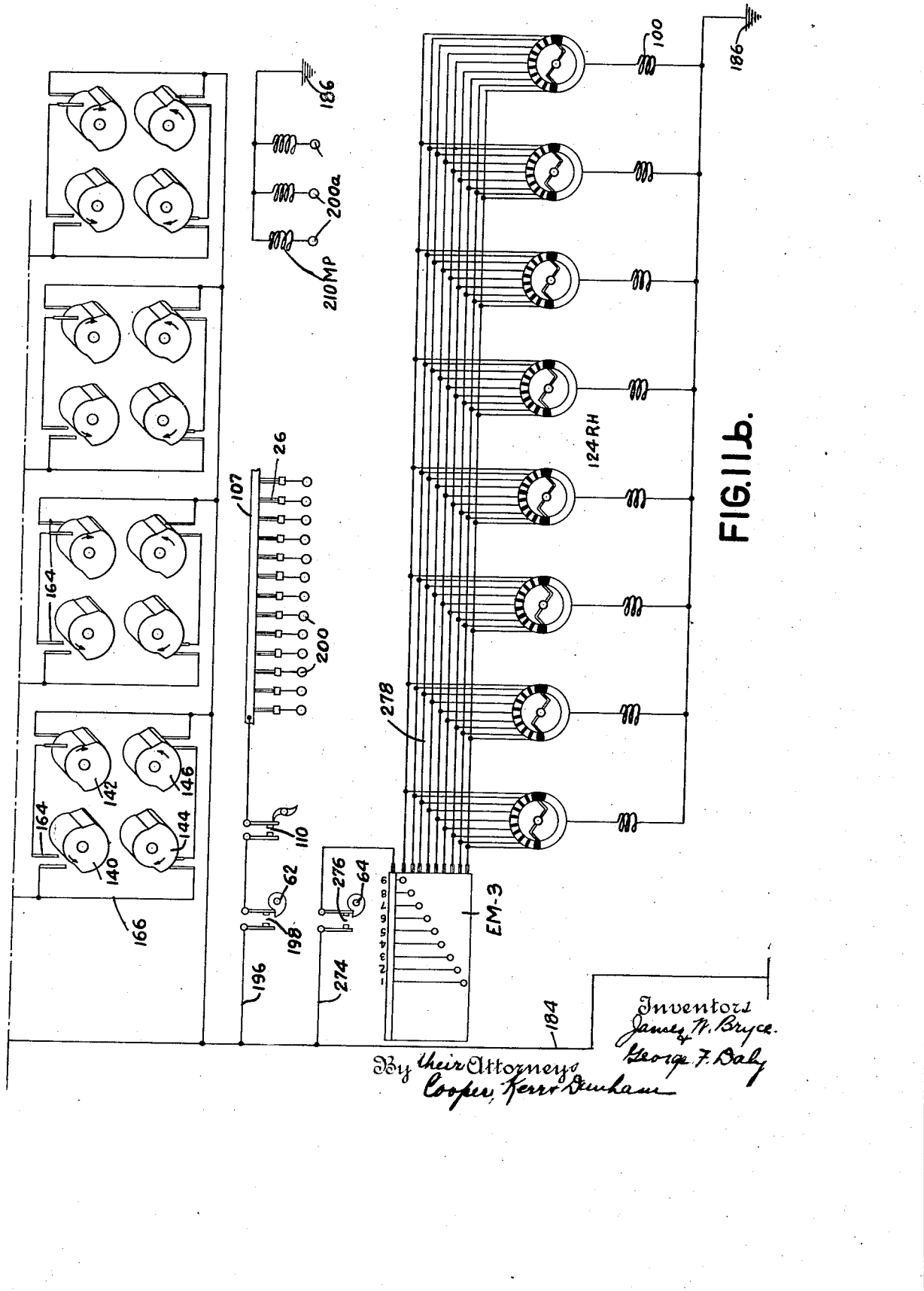

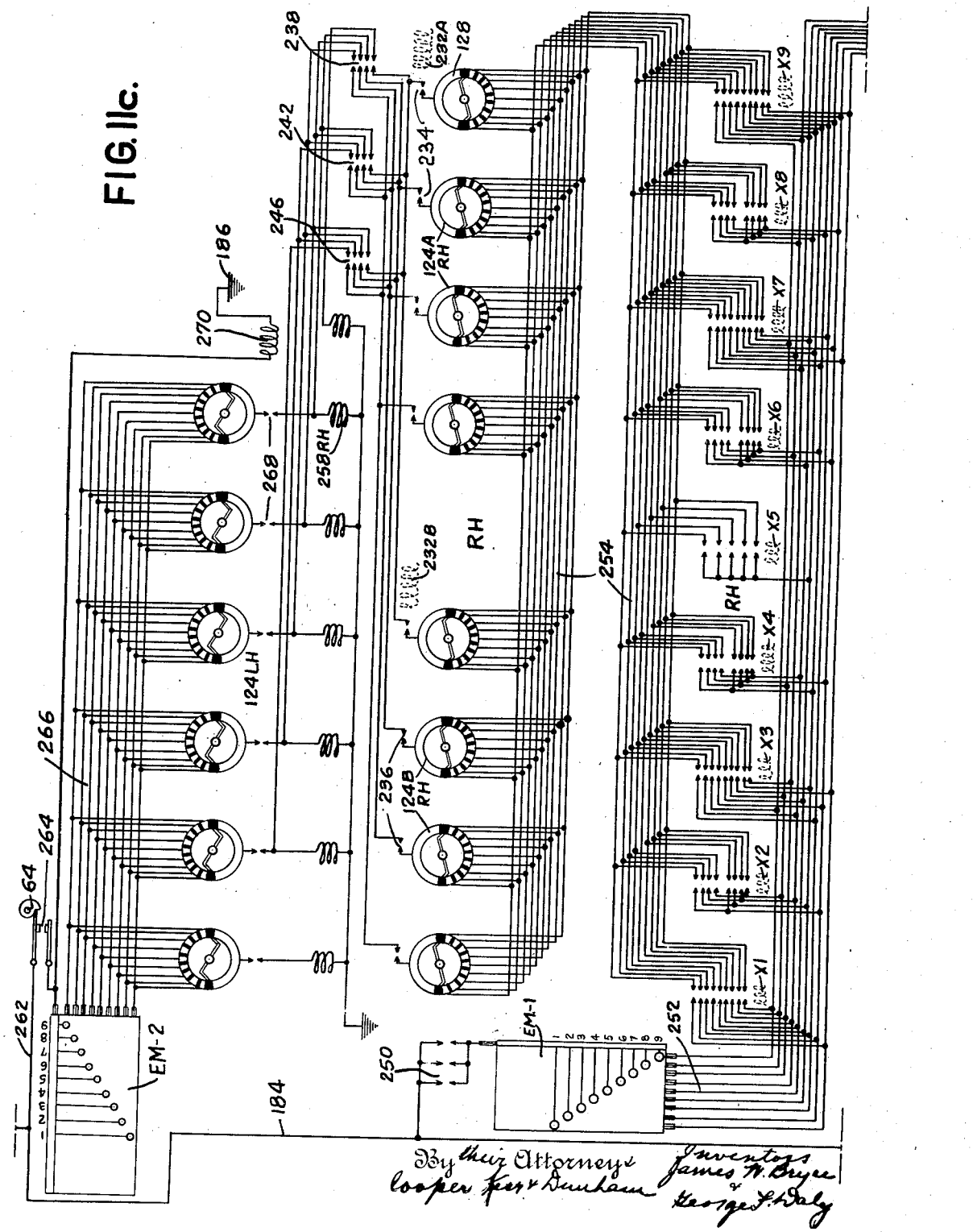

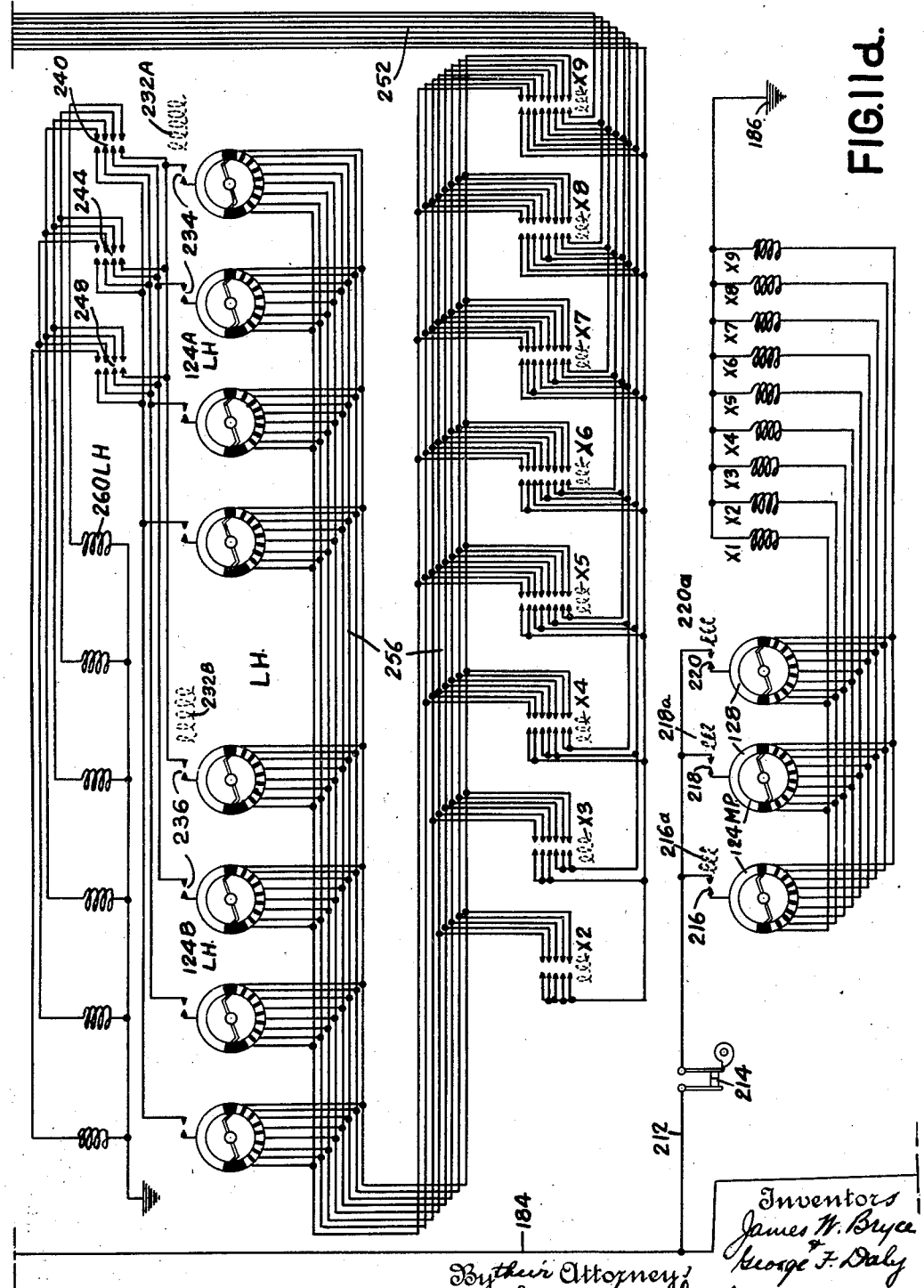

Nov. 29, 1938.    J. W. BRYCE ET AL    2,138,337
ACCOUNTING MACHINE
Filed Jan. 24, 1930    15 Sheets-Sheet 14

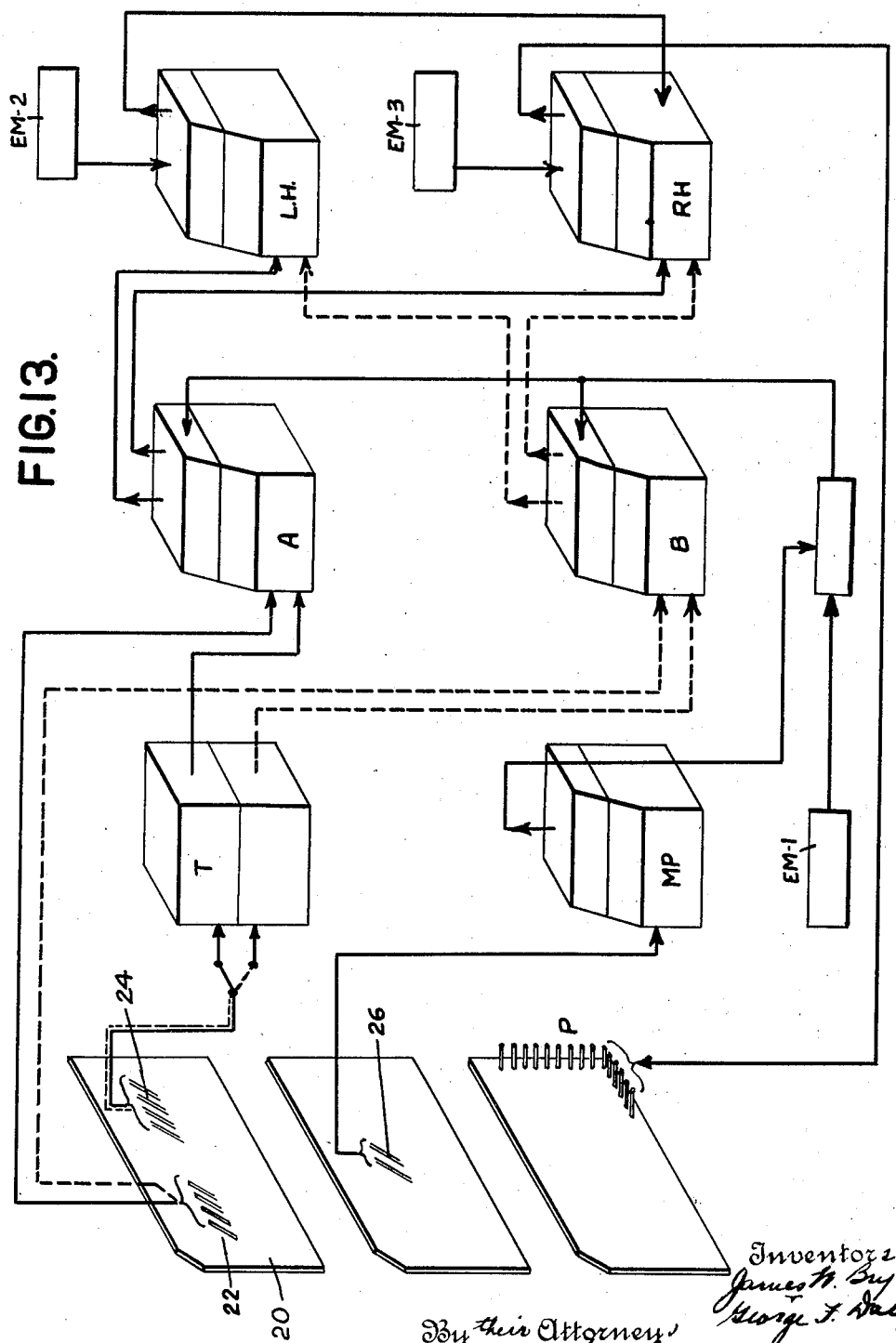

Patented Nov. 29, 1938

2,138,337

UNITED STATES PATENT OFFICE 2,138,337

ACCOUNTING MACHINE

James W. Bryce, Bloomfield, N. J., and George F. Daly, Johnson City, N. Y., assignors, by mesne assignments, to International Business Machines Corporation, New York, N. Y., a corporation of New York Application January 24, 1930, Serial No. 423,000

18 Claims. (Cl. 235—61.8)

This invention relates to improvements in accounting machines.

In numerous commercial transactions, it is necessary to perform adding or subtracting operations and to multiply the sum or difference by another number. For example, an account or an entry in an account may have an amount debited and another amount credited and the balance is required to be extended at some rate. In various businesses there are a great multiplicity of such computed entries which have to be made and heretofore the necessary computations have been tedious and time consuming even if mechanical aids such as adding or multiplying calculating machines were employed.

The present invention is directed to the provision of an improved accounting machine and more particularly to a record controlled accounting machine in which such computations may be made with speed and accuracy.

A further object of the present invention resides in the provision of an accounting machine and more particularly a record controlled accounting machine in which such computations may be made automatically by the operation of the machine itself and in which a record of the result of each computation may be made by the machine and entered upon the record from which the original data was secured.

A further object of the present invention resides in the provision of a machine adapted to perform computations involving addition or subtraction coupled with multiplication and to produce records of the computations which are in such form that they are adaptable for the control of other accounting or compiling devices.

More particularly the present invention is directed to the provision of an automatic machine in which a plurality of records may be placed. Each of the records placed in the machine previously will be punched with numerical data representing numbers to be added or subtracted from each other and each record would also have been previously punched with another number representing a multiplier. Thus each separate record contains original data representative of a particular transaction and for each record there is to be performed first an adding or subtracting operation and second a multiplying operation. After the records thus prepared are placed in the machine, the machine is set into operation and thereafter the machine itself without manual intervention, reads all the numbers on each record, merges some of these numbers, multiplies the merged result by another number derived from the same record and then records back upon the same record the result or product. After these operations are performed with one record the machine automatically clears itself, feeds, reads, merges, computes and records the next record and so on all automatically until the last record has been handled.

Further and other objects of the present invention will be hereinafter set forth in the accompanying specification and claims and shown in the drawings, which by way of illustration show what is now considered to be a preferred embodiment of the invention.

In the drawings:

Figures 1a and 1b taken together show a somewhat diagrammatic assembly view of the complete machine;

In Fig. 2 the problem performed is one of subtracting two numbers and multiplying the difference by another number;

Fig. 4 is a detail sectional view of the card handling and punching mechanism of the machine. This section is taken substantially on line 4—4 of Fig. 1a;

Fig. 5 is a sectional view of the machine which is an outside view of the card handling mechanism in back of the cover. The view is taken substantially on line 5—5 of Fig. 1a;

Fig. 5a is a detail of certain parts which are shown in Fig. 5 in a different position;

Fig. 6 is a detail sectional view of one of the converting analyzers used in the machine and taken substantially on line 6—6 of Fig. 1a.

Fig. 7 is a detail view of one of the accumulating devices which is used in the machine with the read-out mechanism which is associated therewith. The section is taken substantially on line 7—7 of Fig. 1a;

Fig. 8 shows a converting analyzing or translating device in latched position and Fig. 9 shows it in unlatched and displaced position;

Fig. 10 is a diagrammatic view of one of the converters or translaters which is used in the machine together with its circuit connections;

Figure 12:
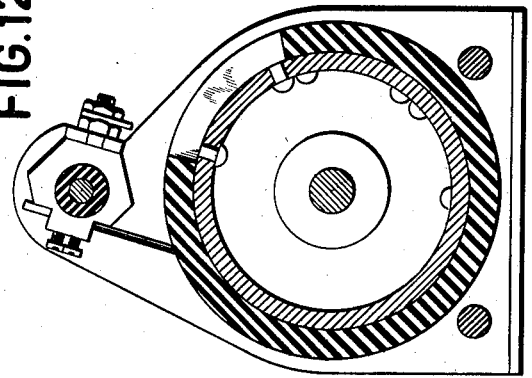
Figure 11E:
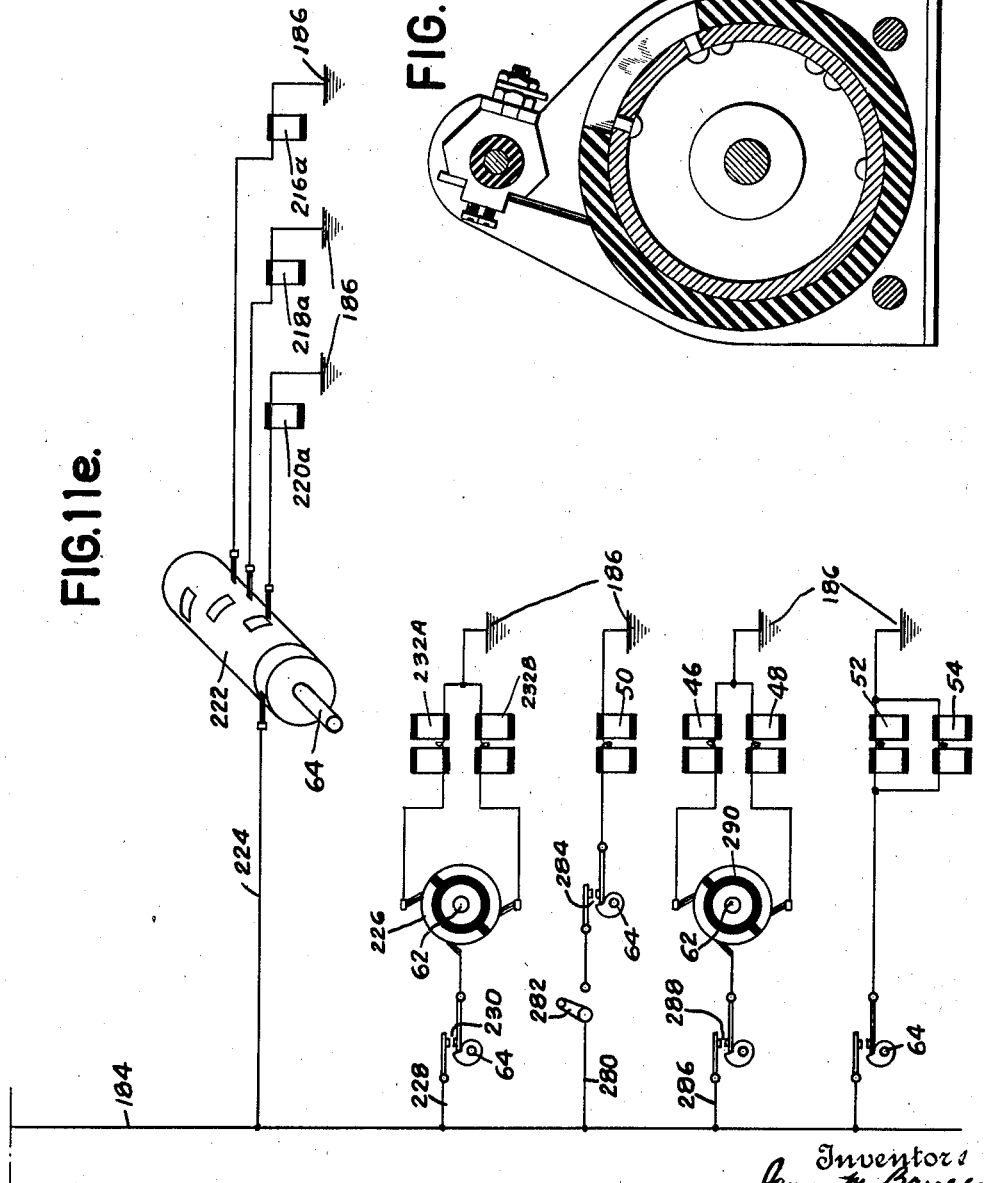

Figs 11a, 11b, 11c, 11d and 11e taken together show the circuit diagram of the complete machine;

Fig. 12 is a detail sectional view of one of the emitter devices used in the machine, the section being taken substantially on line 12—12 of Fig. 1b; and Fig. 13 is a schematic diagram showing the progressive flow of the numbers and steps of a computation as it is performed by the machine.

Before describing the detailed construction of the machine and details of operation thereof, a reference will be made to the problems which the machine is capable of handling.

Figure 2:
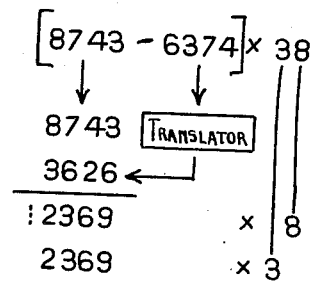
Fig. 2 shows one numerical problem which the machine is capable of performing and shows the various steps in the computation of the problem.
Figure 3:
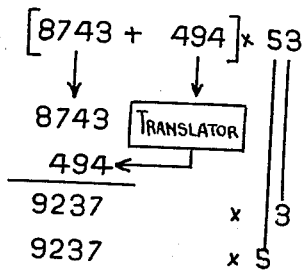
Fig. 3 is a view similar to Fig. 2 but in this figure a different type of computation is performed in which the primary numbers are added together before multiplication.

Referring to Fig. 2, it will be seen that there are two numbers, one of which is to be subtracted from the other. The difference of these two amounts is to become the multiplicand in the computation. In Fig. 3 the two initial numbers are to be added together and their sum is to become the multiplicand. The machine is intended to derive the two numbers, one of which is to be subtracted from the other or one of which is to be added to the other from a record card. The multiplier factor is also derived from the same card.

In general the manner of handling the problem is to read one amount from the card and pass it directly into an accumulator. In Fig. 2, 8743 is read from the card and set up directly in an accumulator. At the same time when 8743 is being read into the accumulator, the subtrahend amount of 6374 is read from the same card and set up into a converting translator. This converting translator then, in a later cycle in the operation of the machine reads, into the accumulator which had previously received the 8743 or minuend, an amount which is complementary to the subtrahend, i. e. 3626. The operation of the accumulator then adds the complement of the second amount or subtrahend and shows a true difference, in this case 2369. This amount of 2369 or the difference is the multiplicand of the to be performed computation. Then by the operation of the machine this multiplicand amount of 2369 is multiplied by 38 or the multiplier and eventually the computed product is punched back upon the card containing the original numbers of the computation.

In Fig. 3 the computation is different in the respect that the initial amounts are added together instead of being subtracted from each other. As before, one amount is added directly into an accumulator and the other amount or 494 is entered into the translator, but the translator in place of entering into the accumulator a complement of the amount as in the Fig. 2 computation, enters the amount as a true and direct number. The translator in this instance functions merely as a storing device for retaining the number until a later adding cycle in the machine. When the final sum is obtained, i. e. 9237, this amount is multiplied by the multiplier as before and afterwards the product is punched back upon the card.

Referring now to Fig. 13, 20 represents a card which has perforated therein a representation of the amount of the two numbers which are to be added or subtracted and also perforations representative of the multiplier amount. Such perforations are not shown in Fig. 13. The device or box, generally designated T is the translator unit which is adapted to receive the second number and convert it into a complement and emit it as a complement or retain it as a true number. A and B are accumulating units. MP is a multiplier entry retaining device and LH and RH are partial product accumulators to respectively receive left hand components of partial products and right hand components of partial products. The final product is eventually accumulated in the RH accumulator. The parts generally designated P represent the punching devices for punching back the product on the record card. EM1 is an emitter for effecting multiplying operations. EM2 is an emitter for transferring accumulations of left hand partial products into the RH accumulator. EM3 is an emitter for transferring final products from the RH device back to the punching mechanism generally designated P.

22 and 24 are the brushes which read the numbers from the cards which are to be subtracted from each other or added together. 26 represents brushes which read the multiplier from the card. As shown in Fig. 13, the reading which is derived by 26 is at a second cycle in the operation of the machine, that is, the card 20 first passes under the brushes 22 and 24 and subsequently the same card 20 moves on to a further position under the brushes 26 at which time these brushes read the multiplier factor from the card. There is a third or subsequent card position in which the card is placed in cooperative relation to the punching mechanism P. In this connection it may be stated that upon the first card cycle brushes 22 read the amount from the card and enter it into accumulator A. Upon the same card cycle brushes 24 read their amount from the card and enter it into translator T. The card then proceeds from under brushes 22—24 to a position in which it traverses brushes 26 and during the time 26 is reading the multiplier from the card and entering it into MP, the translating device T is emitting either the complement or the true number from T into A. While the foregoing second cycle is in operation a new card is passing under brushes 22—24. The amounts which are derived and read from this new card flow as shown by the dotted lines in the diagrammatic Fig. 13, that is, the amounts from the new card as derived by brushes 22 flow not to A as before but follow the dotted line path so as to be entered into accumulator B. The amounts read from the second card by brushes 24 also follow the dotted line path from the card, that is, they flow from the card to the translator device T. The card now goes on to the position in which it traverses brushes 26 and during this part of the cycle the reading from the translator T follows the dotted line into accumulator B. This operation is effected concurrently with the entry by brushes 26 into MP.

It may be explained that there are overlapping cycles in the machine, that is, while a certain amount is being read from one card, other amounts are being read from a succeeding or preceding card and the cycles are overlapped to save operating time.

Referring now to Figs. 1a and 1b, 28 represents the driving motor which through suitable gear and other driving connections is adapted to drive the main drive shaft 30 of the machine. Shaft 30 has the usual gear driving devices for driving the RH accumulator, the LH accumulator, the MP device, the B accumulator and the A accumulator. Shaft 30 at the extreme left extends into the card handling section of the machine (see Fig. 5). In the card handling section there is a gear train comprising gears 32, 34, 36 and 38, the gears of which train are constantly running during rotation of shaft 30. Gear 38 has fast to its shaft a mutilated gear 40 which through a gear train generally designated 42 is adapted to intermittently drive a re-set shaft 44. Re-set shaft 44 is also shown in Figs. 1a and 1b and is provided for re-setting of the various units which operations are effected by clutching up the units for operation by the re-set shaft by means of electromagnetic clutch devices generally designated 46, 48, 50, 52 and 54.

Figure 5:
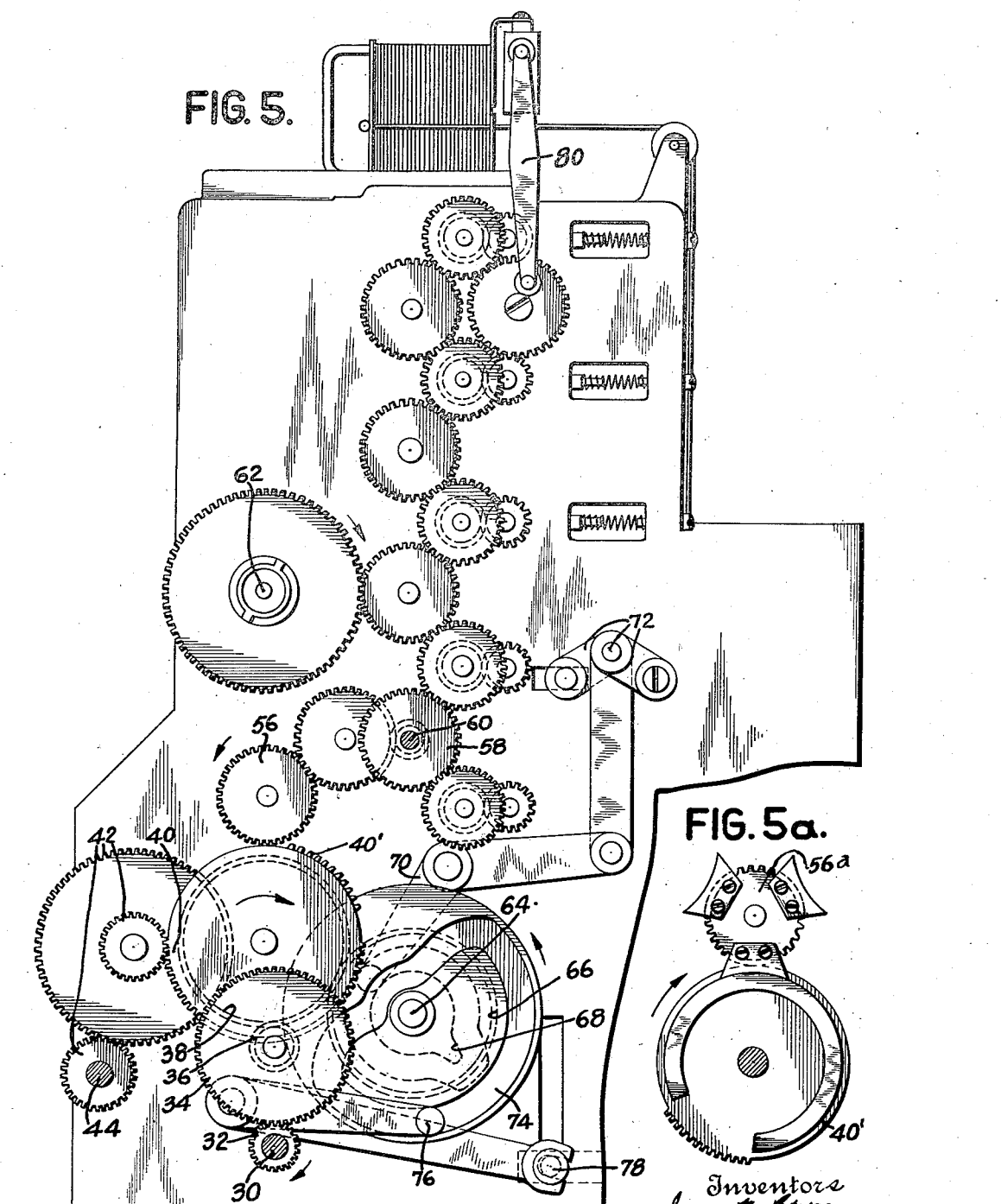

Referring again to Fig. 5, a mutilated gear 40' (see also Fig. 5a) at a certain time of operation, is adapted to impart rotation to a gear 56, through gear 56a mounted upon the same shaft, which gear 56 has a long train of gears associated with it which are adapted to drive the card feed rolls of the machine and a gear is also provided in this train, viz. 58, having fastened to it a shaft 60 which is adapted to drive the translator unit T (see Fig. 1a). Gears 40 and 40', it may be explained, are not the same gears in different positions but are gears on the same shaft in spaced relation one from the other and turning in unison. Gear 40 co-acts with the small gear of the 42 train (see Fig. 5). Gear 40' on the other hand (see Fig. 5a) co-acts with gear 56a, which gear 56a is on the end of the same shaft with gear 56 and spaced from gear 56. Gears 40 and 40' furthermore are not in the same plane and gears 56a and 56 are not in the same plane but are laterally spaced from one another and turn in unison. It may be explained that the translator is operated at the time the card feed rolls are operated and when the card feed rolls are stationary the translator is also stationary. Gears 56a and 40' have associated therewith a Geneva type of locking device as shown in Fig. 5a. This Geneva device locks the feed rolls when they are not in motion for card feed and these feed rolls when they are so locked retain the cards in position either when they are in the analyzing sections of the machine or in the punching section. It will be understood that a card is always gripped between rollers and is never free therefrom during any part of its transit through the analyzing and punching sections of the machine. A shaft 62 is also driven from the gear train, which train is driven by 56. The shaft 62 is used to operate a switching mechanism which will be hereinafter described.

Figure 4:
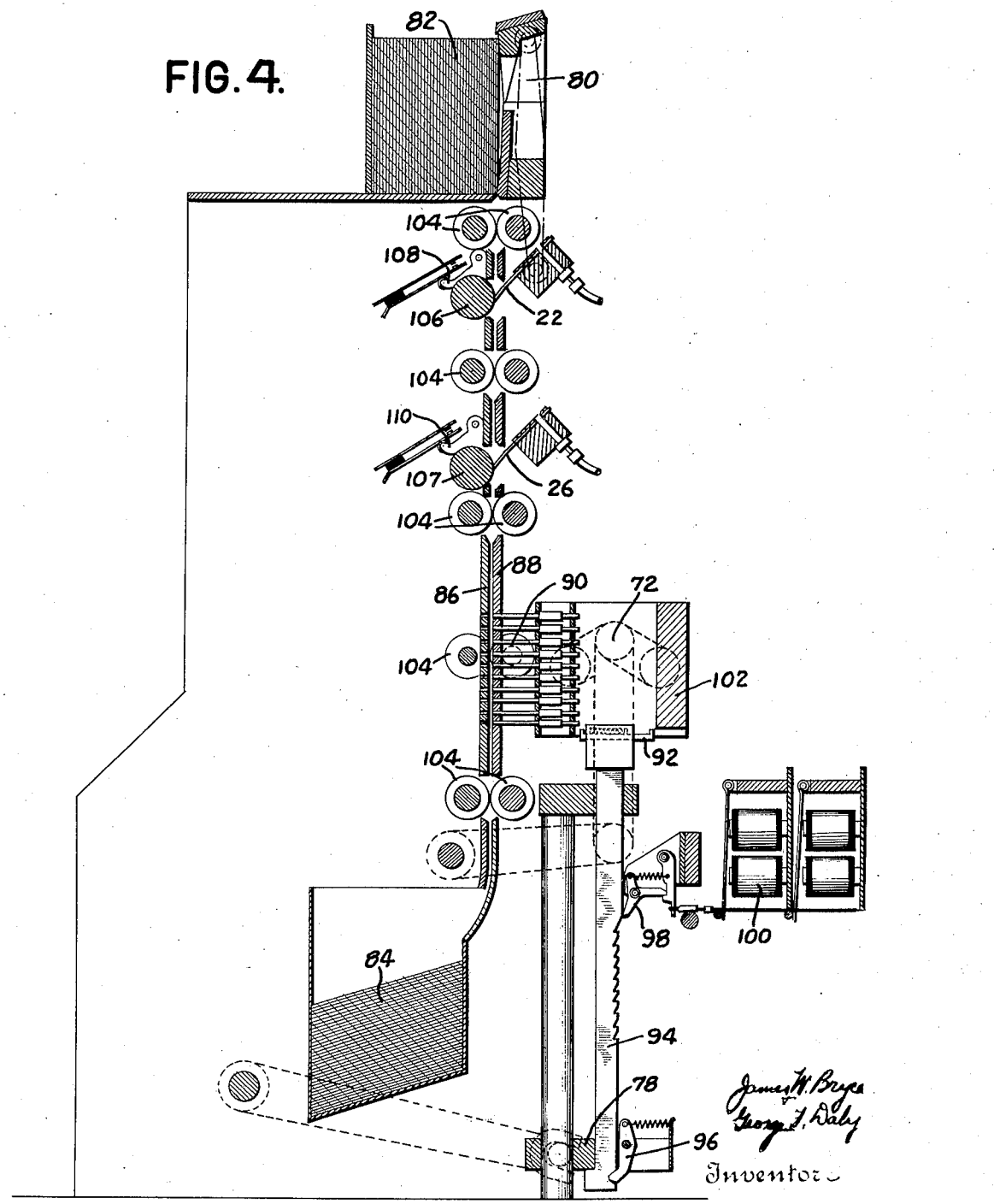

Also disposed in the card handling section of the machine there is a shaft 64 which serves as a cam shaft. This cam shaft is a constantly driven shaft driven from 30 by means of a gear 66, which gear 66 meshes with the gear 38 previously referred to. Disposed on cam shaft 64 are a number of cams which serve to operate various mechanisms in the card handling section of the machine. Cam 68 operates upon a follower 70, which through a linkage extends to a toggle mechanism 72 for operating the punches (see also Fig. 4). Cam 74 co-acts with a follower 76 to reciprocate a cross-head operating member 78. 80 represents the card picker which is driven in the conventional way from the feed roll train. 82 (Fig. 4) represents the card supply magazine and 84 is the card stacking mechanism or discharge mechanism. 86 represents a die, 88 a stripper and 90, sets of punches, any number of columns being provided as desired. 92 is a punch selector pin, one of which is provided for each column and which is carried upon a punch selector bar 94. Each of the punch selector bars 94 is impositively driven by the means of the spring pawl device 96. Each selector is furthermore differentially arrested by means of a pawl 98 which is tripped by one of the punch selector magnets 100 in the customary way. Upon the arresting of the punch selectors 94 by the pawls 98 selection of the punches will be effected and thereafter by the operation of the toggle mechanism 72, the back plate 102 will press 92 to the left and force the selected punches 90 through the card. The various feed rolls for driving the card through the machine need not be described in detail. These rolls are in various sets generally designated 104. It may be explained, however, that the feed rolls do not operate during the cycle of the machine when punching is being effected. 106 represents a rotating contact roll for the upper brushes 22–24 and 107 a contact roll for the lower brushes 26. In addition there is an upper card lever contact mechanism generally designated 108 with contacts 109 on the circuit diagram (Fig. 11a) and a lower card lever contact mechanism generally designated 110.

Referring now to Fig. 1b there is also a driving gear train from shaft 30 to the various emitter devices EM1, EM2 and EM3. Such emitter devices are shown as disposed on top of the MP devices in the locations indicated.

The accumulating devices A and B, LH and RH and MP are substantially of the type shown in Lake Patent No. 1,307,740, and Lake Reissue Patent No. 16,304. Such devices, however, have a different type of read-out mechanisms from that employed in the accumulator which is shown in the Lake reissue patent. Accumulators A and B have the read-out mechanism which is shown at the top of Fig. 7. Accumulator devices MP, LH and RH on the other hand have an upper read-out mechanism which is substantially identical with the read-out mechanism shown in Fig. 7 except that the right hand read-out commutators associated therewith are entirely omitted. In other words the idler gear 112 in Fig. 7 is omitted and the entire right hand commutator assembly driven by this idler gear is also omitted.

The read-out mechanism will now be described in reference to Fig. 7. Part 114 is the usual clutch driven gear of an electromagnetic accumulator of the type hereinbefore referred to. Such clutch gear drives a gear 116, which gear has secured to it a brush holder 118 having two brushes 120, 122 carried thereby and adapted to traverse an insulated commutator 124 having a number of conducting spots 126 therein. One of the brushes 122 or 120 is adapted to be disposed on one of the conducting spots 126 when the other brush is in contact with a current supply conducting segment 128. The right hand read-out commutator is of identical construction except that its gear 116a is driven by the intermediate gear 112, which gear in turn is driven by gear 116 pertaining to the left hand commutator. The spots on the commutator are representative of digit values which are set up upon the accumulator wheels 130, that is if the accumulator wheel 130 has standing on it a setting of 8, one of the brushes 120 or 122 will also stand on the eighth conducting spot 126 while the other related brush will be in contact with the current supply segment 128.

*Transposer mechanism*

Figure 6:
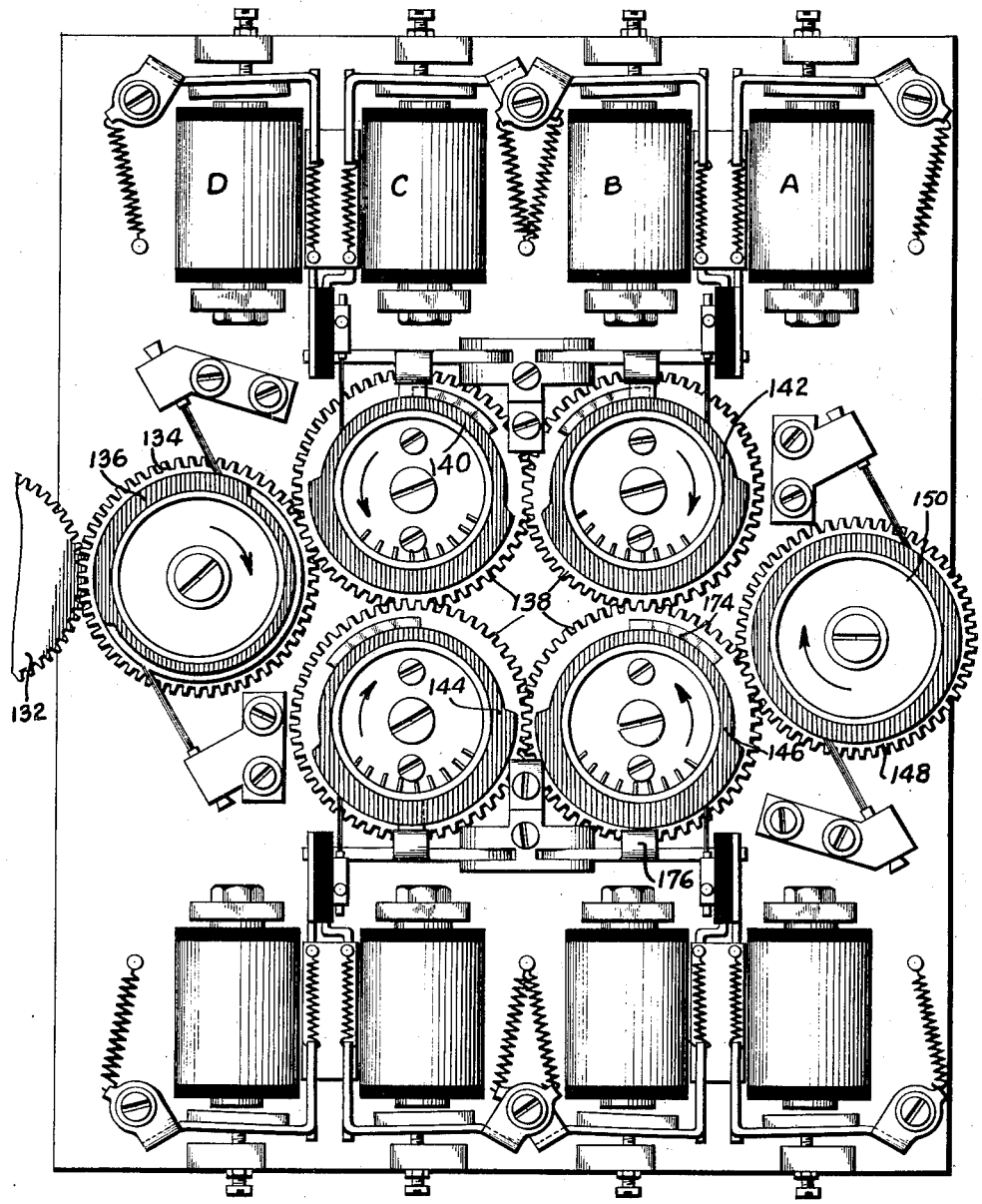

Referring now to Figs. 6 and 10, it will be understood that a number of transposer units are provided one for each column on the record card which is to be read and transposed or entered without transposition. Referring now to Fig. 1a, the drive shaft 60 has a gear 132 thereon for each analyzer or transposer unit. One driving gear 132 is provided for each transposer unit. Gear 132 drives a gear 134 (see Fig. 6) which gear 134 has secured to it a commutator or distributor 136. 134 also in turn drives gears 138. Each of the gears 138 has associated with it an associated commutator or distributor device which is individually designated 140, 142, 144 and 146. Gear 138 which operates the distributor 146 also drives a gear 148 which has associated with it another distributor 150.

Referring to Fig. 10, it may be explained that associated with distributors 136 and 150 there are manipulative switches 152, 153, 154 and 155. When the device is to be used for addition, these switches are in the position shown in Fig. 10, but when subtraction is to be effected they are depressed to a lowermost position which is the reverse from that shown so that circuit relations are established with distributor 150 and circuit relations are cut off from 136. As shown current coming in from the card through circuit 156 branches so as to be supplied to the distributor ring 158 on distributor 150 and to ring 158a on distributor 136. The spots 160 on 150 are arranged to contact with the collector brushes generally designated 162 and establish circuits to energize magnets D, C, B and A in combinations according to the digit value of the reading which is received. The selective energization of D, C, B and A in combinations shifts the brushes 164 according to which of the magnets D, C, B or A is energized. Thereupon upon the ensuing rotation of the commutator devices 144, 146, 140 and 142, a read-out circuit is established through the various brushes 164 and the spots on the various commutators so that the reading or emission of an impulse on the read-out line 166 is made in complementary manner, that is, if the number 8 is read in through the brush circuit 156, the emission of an impulse on the read-out circuit 166 would be a "one" designating impulse. All of the transposer units are complemented to 9 except the one used for the units column and this is complemented to 10. That is, if 8 were read in on the brush circuit 156 pertaining to the units order, the emitted impulse would be one representative of 2.

Figure 9:
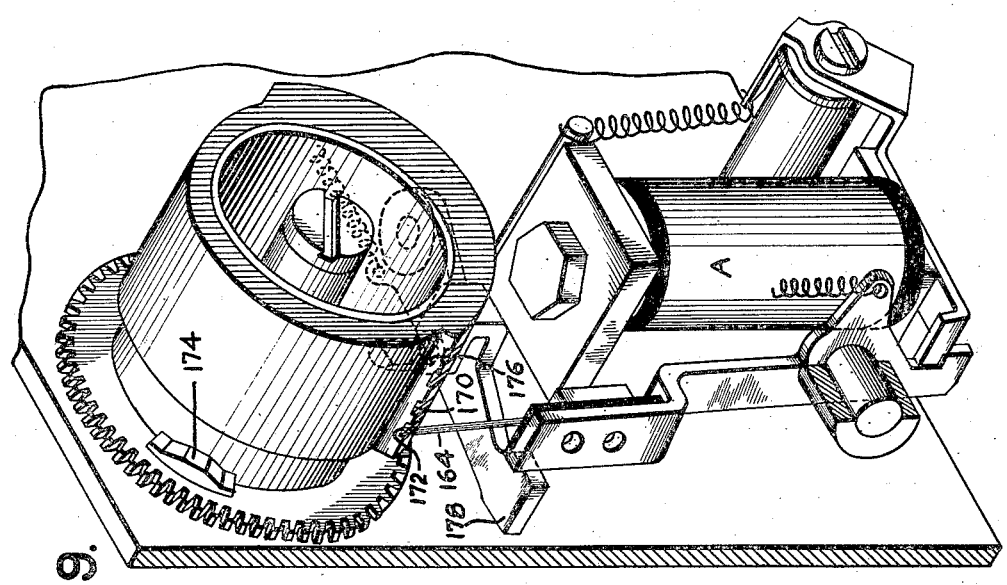
Figs. 8 and 9 are perspective views showing the converting analyzing or translating devices in different positions.
Figure 8:
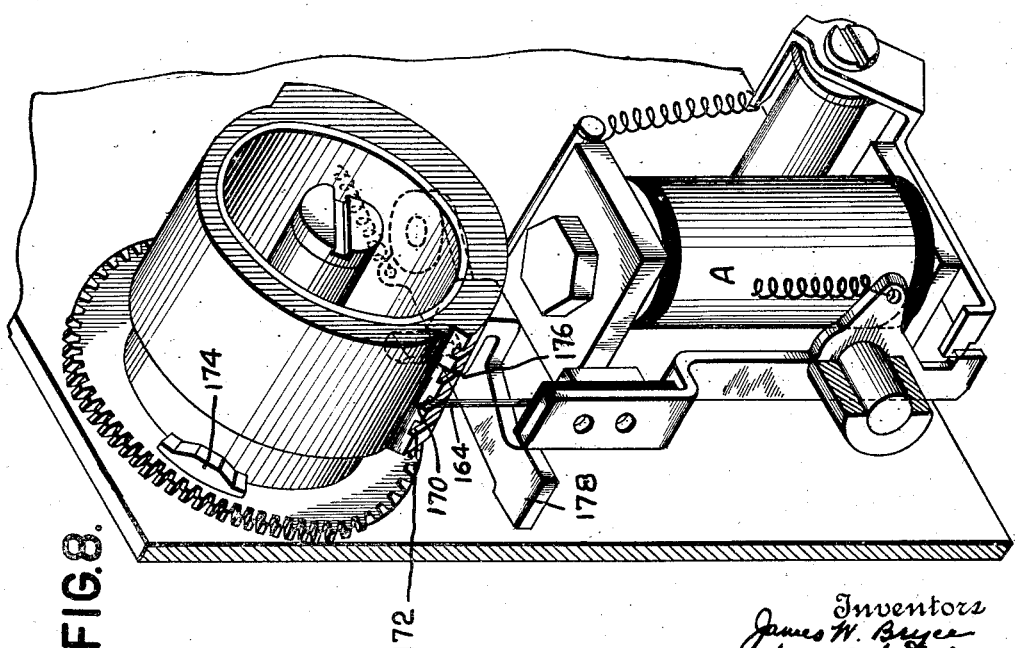

The foregoing transposition of impulses to the complemental reading is effected in all cases when commutator 150 comes into action. When commutator 136 is in action by reason of the adjustment of switches 154 and 152 the read-out impulse is the same as the read-in impulse. This is effected by the arrangement of the spots 160a on commutator 136, they being arranged in a different manner so as to selectively energize magnets A, B, C and D in combination in proper manner to emit the read-in impulse instead of a complement of that impulse. Figs. 8 and 9 show a perspective of a fragment of one of the commutators cooperating with one of the gears 138. In Fig. 8, assuming the magnet A to be energized, brush 164 will by the energization of the magnet be shifted from the track marked 170 in Fig. 8 to the position shown in Fig. 9 in cooperation with track 172. The spots on the commutators 140, 144, 146 and 142 are arranged in proper relation in the tracks to give the desired completion and establishment of the read-out circuits 156 for the desired impulses. As in previous transposing devices the arrangement is duplicated, there being a duplicate set of magnets A, B, C, D, etc., shown to the left in Fig. 10. The right hand group of magnets A to D read in from one card and during the next cycle read out on the read-out circuit 166. The left hand side of A to D inclusive is set up to read in the next card. At the end of the read-out cycle of either set of magnets, restoration of the brushes to initially latched position is effected by a camming element 174, Fig. 8. The cam 174 co-acts with the lug 176 upon a restoring lever 178 to restore the brushes to normal position. The translator in its general details of construction is similar to that shown in James W. Bryce, Patent No. 1,791,953, dated February 10, 1931 except that in the earlier application only one distributing commutator 150 was employed in lieu of two distributing commutators 150 and 136 which can be selectively used as in the present case.

It will be assumed that the machine is set for subtraction and that the machine is to be used to perform a problem such as shown in Fig. 2. The passage of the card past brushes 22, reads into accumulator A the amount of 8743. At the same card cycle when 8743 is being read into A the amount of 6374 is being read into the translator devices T by brushes 24. This reading in occurs during the first part of the rotation of the commutators 150, 136, 142, 146, 140 and 144. On the second half revolution of the commutators or during the second machine cycle or card reading cycle the read-out circuits 166 become energized and enter the complement of the amount from the translators T into the accumulating devices A. This complementary amount is 3626 in the problem under consideration. At the end of this entering cycle the accumulator A stands with an amount of 2369 thereon which is the amount of the multiplicand in the to be performed computation. By the time that 2369 has been set up on accumulator A the brushes 26 will have traversed the card and entered the amount 38 into the entry retaining devices MP. While this device is in the form of an accumulator no amounts are accumulated in it. The machine is now ready for performing a multiplying computation.

*Circuit diagram*

Referring to the circuit diagram (Figs. 11a to 11e, inclusive) 180 represents a suitable source of current. 182 is a switch which when closed connects the motor 28 in circuit and also connects the source of current to a supply main 184. The opposite side of the motor circuit extends to ground 186 and various other circuits are completed from 184 to the ground 186. Obviously a return circuit could be used in lieu of the ground 186.

*Brush supply circuit and item entry circuits*

Figure 11A:
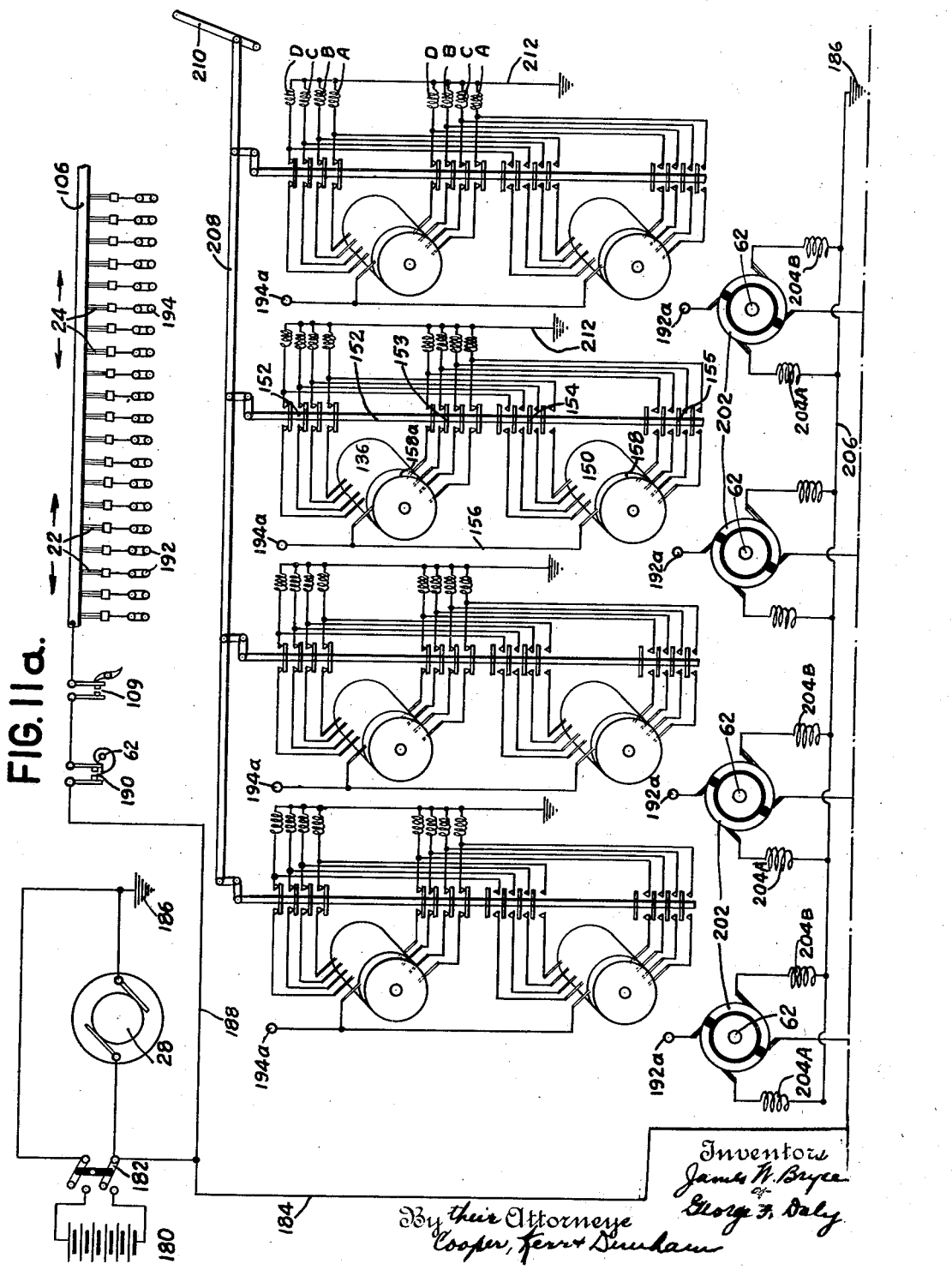

Referring to Fig. 11a a circuit 188 extends from 184 through cam contact devices 190 through the upper card lever contact devices 109 to the upper contact roll 106. The various brushes 22-24 are provided with plug sockets 192 and 194 respectively, 192 being associated with brushes 22 and 194 with brushes 24. Obviously any desired number of brushes 22 can be used for the first number and any desired number of brushes 24 for the second number and corresponding numbers of sockets 192 and 194 can also be used. To supply the contact roll 107 pertaining to the lower set of brushes 26, a circuit 196 is provided which extends through cam contact devices 198 through lower card lever contact devices 110 to contact roll 107. Associated with brushes 26 are a number of plug sockets 200. Cam contact devices 190 and 198 previously referred to are disposed upon shaft 62 previously referred to (see Fig. 5 and also Figs. 11a and 11b). The machine is provided with a number of plug sockets 192a (Fig. 11a) adapted to be plugged up by plug connections to 192 for entering the minuend or first item and sockets 194a are also provided adapted to be plugged up by plug connections 194 for entering the subtrahend or second item if this second item is to be added. Commutator switching elements generally designated 202 (Fig. 11a) are associated with the plug sockets 192a and such commutator switching devices are disposed on the shaft 62 previously referred to (see Fig. 5). These switching devices are adapted to alternately direct the entry of an item into the counter magnets 204 pertaining to accumulator A (so that they will be accordingly designated 204A) or into the counter magnets 204B which pertain to accumulator B. A common return is provided from all of the magnets 204A and 204B which is designated 206, which extends to ground 186. The switching devices generally designated 202 also perform the function of alternating the switching of the read-out circuits 166 from the commutators 140 and 142, 144 and 146 first on one cycle into 204B and then on the second cycle into 204A. It may be explained that when an entry is being received from brushes 22 through plug sockets 192—192a and into 204A a read-out entry is being received over 166 and into 204B. Subsequently when the card entry is being directed into 204B, the entry from the translators is being directed into 204A.

The foregoing description has explained how the multiplicand or first factor is entered into the machine and set up on accumulators A or B. The entry of the subtrahend or second factor will now be explained.

Plug connections are established from 194 to 194a (Fig. 11a) and from 194a feed circuits 156 are provided which lead respectively through feed brushes to feed rings 158a and 158 of commutator devices 136 and 150 respectively. 152 and 153 as before explained are switching devices pertaining to commutator switching device 136 and devices 154 and 155 pertain to commutator switching devices 150. All of the various switching devices 152 to 155 inclusive for the different columns of the device are preferably connected to a common operating member 208 which may be operated by a suitable adjusting device such as a lever 210.

In the diagram, Fig. 11a, 212a represents the return to ground circuit from the magnets A to D inclusive. As has been previously explained, it is the entry which is received from 194 through 194a and selectively through the switching devices 136 or 150 which sets up the brushes 164 which cooperate with the various translator commutator devices 140 and 142 and 144 and 146. Accordingly, the entry received from the brush set 24 is adapted to set up the translators and convert it or not according to whether the switching mechanism 210 is adjusted to one position or the other. In the position shown in the diagram, Fig. 11a, the switching circuits are set up for addition, but it is obvious that they can be moved to reverse position to open contacts 152 and 153 and close 154 and 155 in which case the translators will be set up for subtracting the items entered into the machine.

The foregoing explanation has explained how an entry of added items or subtracted items derived from a single card is set up on counter A or counter B. It is the accumulation of A or B which is used as the multiplicand of a to be performed computation.

Multiplier set-up

From plug sockets 200, plug connections are employed to plug sockets 200a (Fig. 11b) which are associated with counter magnets 210 MP pertaining to the multiplicand entry retaining device MP. The other side of the circuit extends to ground 186 in the usual way. By plugging up from 200 to 200a the multiplier is entered into the device MP and set up therein.

Read-out devices for various accumulators

It has been previously explained that commutator devices 124 are associated with the accumulating devices and entry retaining devices A, B, LH, RH and MP. As has been explained heretofore the A and B counters are provided with two sets of these commutator devices 124. One of these sets of commutators being used for left hand components and another set being used for right hand components. Accordingly, on the diagram the read-out commutators which are associated with counters A have been designated 124A RH and 124A LH (Figs. 11c and 11d). Those associated with counter B have accordingly been designated 124B RH and 124B LH (Figs. 11c and 11d). Those commutators which are associated with the multiplier entry retaining devices Mp have been designated 124 MP and those which are associated with the RH and LH accumulators have been designated respectively 124 RH and 124 LH. To supply current to the multiplier read-out devices 124 MP a circuit 212 is provided through cam contact devices 214 through column selection relay points 216, 218 and 220 and to the collector rings 128 pertaining to the read-out devices 124 MP. It may be explained that contacts 220 pertain to the units column of the multiplier, 218 to the tens, 216 to the hundredths and so on. In order to effect a multiplication, provision is made to close 220 first and after the computation has been made by units to thereafter close contacts 218 and so on. To effect sequential closure of 220, 218 and 216 relay magnets 220a, 218a, 216a are provided. These magnets 220a, 218a and 216a are sequentially energized by a switching commutator 222 (see Fig. 11e) which is disposed on the main cam shaft 64. Current is supplied to 222 from supply main 184 by supply circuit 224. It will be understood that during the operation of the machine, magnet 220a will be energized first during the computing cycle and thereupon the units multiplication will ensue. Subsequently on the tens computation 218 will be closed and so on.

According to the set up of the brushes cooperating with 124 MP, circuits will be established to multiplier relay coils X9, X8 to X1 inclusive. These relay coils at the opposite side connect to ground 186 as shown.

It has been previously explained that due to the overlapping cycle relations in the machine, two accumulators A and B are employed for the multiplicand. The multiplicand as derived from one card will be in A and the multiplicand in the next card wil be in B. If there is a complete entry of a multiplicand in A at this time in the cycle there is an incomplete entry into B and it is only later in the machine cycle when the entry becomes complete in B. Accordingly the process of multiplication must be effected first from A and then later at another cycle from B. Then again from A and afterwards again from B and so on ad infinitum. To provide for this alternate deriving from amounts of A and B during alternating cycle the following switching means is provided. Disposed on shaft 62 is a commutator switching device 226 adapted to alternately direct current received by a line 228 through cam contact devices 230 disposed on shaft 64, to magnets 232A and 232B. The other side of 232A and B connects to ground 186 as shown. The arrangement is such that 232A will be first energized and then at a later cycle 232B will become energized. Magnet 232A when energized closes contacts 234 to supply current to the read-out devices 124A LH and also closes contacts 234 to supply current to read-out devices 124A RH. Magnet 232B has associated with it contacts 236 which supply current to the read-out devices 124B RH and 124B LH.

It has been previously explained that magnets 220a, 218a and 216a were column selection magnets. These magnets have associated with them and controlled thereby contact points 238 and 240 which are controlled by 220a, 242 and 244 which are controlled by 218a, and 246 and 248 which are controlled by 216a. Magnets 216a, 218a and 220a also are adapted when energized to close one of the contact points 250. One of these contact points 250 is provided for each magnet 216a, 218a or 220a. Closure of one of the contacts 250 supplies current from supply main 184 to a conductor ring of emitter EM1. The emitter is of the type generally shown in Fig. 12 and rotates in cyclic time with the operation of the machine and is arranged to emit impulses over a series of nine lines which are generally designated 252. One impulse is emitted to each line for each index point in the cycle of the operation of the machine. For example, for the line 252 at the extreme right there is an impulse emitted over this line at the 9 index point of the cycle. At the next line at the left there is an impulse emitted on the 8 index point and so on. Lines 252 have connected to them branch lines which lead to the contact points of the multiplying relays. These contact points are associated with multiplying relay coils X9 to X1 inclusive. From the other side of the contact points of these multiplying relays there are two groups of lines generally designated 254 and 256. Lines 254 extend to and connect with the read-out devices 124B RH and to the read-out devices 124A RH and lines 256 extend to and connect to the read-out devices 124B LH and 124A LH. It will be understood that the setting of the 124 readout devices is such that the same have set up thereon the amount of the multiplicand which is to enter into the computation. The number of contact points pertaining to a given relay and the inter-connection of the lines 252 to 254 or from 252 to 256 is made in accordance with the computation which is to be performed.

It will be assumed that the machine is to multiply 2369 (see Fig. 2) by 38. The multiplication of 9 by 8 will now be traced. It will be remembered that the amount of 8 is set up on the units order read-out devices 124 MP. Accordingly in the proper time in the operation of the machine magnet X8 will be energized. The amount of 9 will be set up on 124A RH and also on 124A LH. The circuit will be first traced from the 9th spot of 124A RH. By noting the connections it will be seen that the 9th spot of 124A RH is connected to the bottom wire of the 254 group and through the contact points of multiplying relay X8 is connected to the second line from the bottom of the 252 group. The emitter EM1 will emit an impulse at the 2 index point over this line. So accordingly, there will be a two impulse emitted out past the contact 234 and thence through contacts 238 to the units counter magnet 258 of accumulator RH. The counter magnets will be accordingly designated 258 RH pertaining to this accumulator. This will enter an amount of 2 into the right hand order of accumulator RH, 8 by 9 being 72 and 2 being the amount of the multiplication in the units place.

The entry of a left hand partial product can be correspondingly traced from 124A LH tracing again from the 9th spot of 124A LH pertaining to the units order the line will extend to the lowermost line of the 256 group which upon being traced down past multiplying relay contacts pertaining to X8 will be found to connect to the third from the top line of the 252 group, which upon being traced over to the emitter will be found to receive an impulse at the 7 index point position. Accordingly, by the action of the emitter an impulse will be emitted at the 7 index point over this set of lines through 124A LH through 234, through 240 to the lowermost line and to the units order counter magnet of RH. The counter magnets in this counter being designated 260 LH. There will accordingly be a separate entry of the left hand component of the partial product into LH. When the units order of multiplication is complete the magnet 220a is de-energized in the manner previously explained and 218a energized. This will close contacts 242 instead of 238 and will also close 244 instead of 240 and will take the entry into the second orders of magnets 258 RH and 260 LH. There is accordingly this sequential operation on the various orders of the multiplicand and there is also a sequential operation on the orders of the multiplier by reason of the successive closure of 220, 218 and 216. It is to be remembered, however, that all of the figures in the multiplicand are concurrently computed during one computing cycle using one figure of the multiplier and that during a succeeding cycle the next denominational order of the multiplier is used to multiply the same figures by the second order of the multiplier. The effect of the opening of 240 and the closure of 244 for example, is to step over the order of the entry into magnets 260 LH one step to the left as is the usual practice in multiplication. The operation of the machine carries out the complete computation finally gathering together all of the left hand components of partial products into counter LH and gathering together all of the right hand components of the partial products into counter RH. It then becomes necessary to transfer over the accumulation which stands in the LH accumulator into the RH accumulator, note Fig. 2. Entry must also be made relatively one column to the left as is shown in Fig. 2. This is effected in the following manner.

A supply circuit 262 (Fig. 11c) is provided for the emitter EM2 which leads into the emitter through cam contact devices 264, the cam being disposed upon shaft 64. During the operation of the machine when this cam contact closes the emitter operates to impart a succession of impulses to a set of lines 266 which are connected to the read-out devices 124 LH. The read-out devices are set up in accordance with the reading which stands on the LH accumulator and accordingly the impulse corresponding to the set up of these read-out devices 124 LH is transmitted through them to the counter magnets 258 RH pertaining to accumulator RH. It will be noted in the diagram the units order read-out devices 124 RH is connected to the tens order of counter magnet 258 RH and accordingly the entry is made in the proper orders of accumulator RH. In order to eliminate any desirable back circuits the outgoing circuits from the devices 124 LH are provided with a number of controlling contacts 268 adapted to be closed by a relay magnet 270 which relay is energized upon closure of cam contacts 264.

*Product punching*

The only remaining operations which need be described are the product punching and the resetting of the various accumulators.

Emitter EM3 is provided with a supply line 275 (Fig. 11b) leading into the emitter via cam contacts 276 (also disposed on shaft 64) and extending from the emitter are a series of line 278 which extend to the read-out devices 124 RH pertaining to the accumulator RH. Upon operation of the emitter EM3 the reading standing on RH is caused to energize the punch selecting magnets 100 (Fig. 4) at the proper time in the cycle of the cross-head to arrest the punch selector bars 94 to cause subsequent proper punching in accordance with the amount standing upon 124 RH.

*Re-setting*

Assuming that the computation is first completed from the A accumulator, this A accumulator is re-set first and at one complete machine cycle. Later the B accumulator is re-set. In order to re-set these and other accumulators the following controlling circuits are provided. From line 184 a circuit 280 (Fig. 11e) leads through a switch 282 past cam contact devices 284 to re-set one revolution clutch magnet 50 and thence to ground 186. Cam contacts 284 are disposed on shaft 64. Another re-set circuit is also provided designated 286 which leads through cam contact devices 288 to a selecting switching commutator 290. Commutator 290 is mounted on shaft 62 and alternately directs current through re-set clutch magnets 46 or 48 at successive computing machine cycles. In the re-setting operation 50 and 46 are preferably energized concurrently followed later on by an energization of 48. By providing the switch 282 for the multiplier re-set magnet 50 it is possible to derive a rate from the first card which is passed through the machine and thereafter switch 282 may be opened and the set up multiplier or rate amount can be retained and subsequently multiplied by the numbers received from the succeeding cards.

Due to the fact that there are overlapping cycles utilized in the machine, it will be convenient to describe the cyclic operation of the machine by assuming that a succession of variable colored cards are passing through the machine.

Let it be assumed that the first card is a red card which is followed by a white card, which in turn is followed by a blue card, the blue card then being followed by a red card and so on. With a machine herein described, three computing cycles have been allotted for the actual multiplying, since the multiplying capacity is in this particular embodiment limited to multiplying by 999. Obviously a greater multiplying capacity could be had by the provision of additional cycles.

In the machine here disclosed, one machine cycle comprises six computing or card cycles. Let it be assumed that a series of cards, red, white and blue, are introduced into the machine and the machine started up from an empty condition and that the first card is a red card. In the first card cycle of the machine cycle a red card passes the upper brushes, the minuend is read from the red card into accumulator A and the subtrahend is read from the red card into the translator T. The next card cycle is an idle cycle. The third cycle is likewise idle, the fourth is idle, but on the fifth cycle the timing of the parts is such that accumulator B is re-set, the sixth cycle is again idle. This ends the first machine cycle which is consumed in getting the first card into the machine and read. The second machine cycle comprising six cards or computing cycles then ensues. On the first card or computing cycle of this second machine cycle, the following events ensue.

A red card passes the lower brushes and reads the multiplier into MP. The complement of the red card or the subtrahend is read into A from the translator. The red card stops at the end of the cycle in the punching position. Concurrently with the above and in the same cycle the white card passes the upper brushes, the minuend from this white card is read into B and the subtrahend from this white card is read into the translator. Further card movement of the white card then stops. On the second card or computing cycle the difference which has been previously set up in A from the red card is multiplied by the units set-up of the multiplier on MP. On the third computing cycle the difference in A is again multiplied by tens columnar amount of the multiplier in MP. On the 4th computing cycle the difference in A is multiplied by the hundredths columnar amount set up in MP. During the last three cycles, viz. the second, third and fourth, the partial products are accumulated in the LH and RH accumulators. Now on the fifth cycle the following events take place. The A accumulator is re-set, concurrently with this action the LH component summations and the RH component summations are added together into the RH accumulator to form the final product. Also in this cycle the fifth, the multiplier device MP is re-set. On the sixth and last cycle the product is read from the RH device and punched back into the red card.

On the next following machine cycle or third machine cycle the red card passes out of the machine and into the stack in the first computing cycle. The white card passes the lower brushes and reads the multiplier into MP and the complement of the subtrahend derived from the white card is read into B. Concurrently with this action and in the first card or computing cycle of the third machine cycle the blue card passes the upper brushes, the minuend therefrom is read into A and the subtrahend therefrom is read into the translator. The following and ensuing cycles are repetitious of those described in the second machine cycle.

Generally in the use of multiplying machines the amounts which are handled in multiplying computations deal with physical things and accordingly the results of such multiplications are usually variably positive quantities. The present machine, however, may in some instances be used for recording a result which is a complemental quantity. Suppose the amount under the brushes 22 is zero and the amount under the set of brushes 24 is 952. Under these conditions there will be no entry from the record into the first accumulator and by the translator, 048 will be entered into such accumulator. Assume furthermore, that the multiplier amount upon the card as read by brushes 26 is a unitary amount of 1. Under these conditions the amount punched back on the card will be the true complement of 952 or 048 and such complementary amount of the amount data read from the record can be punched back on the card from which the amont data was derived. The punching of a complementary amount back on the card is of utility in machines of this class because in some computations it is desirable to convert an amount into its complement and punch back upon the record from which the direct figure is taken the complement of such amount. The present machine is adaptable for such form of computations. The present machine is not intended for computations of the form in which the first amount is a real number which is smaller than the second number which is also a real number. The machine is adapted for operations where the first amount is zero, the second amount is a real number and where it is desired to have the machine produce automatically a perforated record of the complement of the second amount.

According to the present invention the machine is capable of performing computations according to the general equation form:

(1) $$(A+B) \times C$$

In this computation the algebraic adding of the A term with the B term is effected by addition.

The machine is also capable of performing computations according to the general equation form:

(2) $$(A-B) \times C$$

In this computation the algebraic adding of the B term with the A term is effected by subtraction.

The machine is also of such nature that computations can be performed according to the general equation form:

(3) $$(A \pm B) \times C$$

According to this equation the machine is selectively capable of algebraic adding the terms A and B either by addition or by subtraction as desired.

The term "algebraic adding" as hereinafter used in the claims is a broad term covering either equation (1) above alone, equation (2) alone or equation (3) alone. Such alegbraic adding terminology when broadly used is not limited to the selectivity feature of equation (3) alone but is intended to cover also a machine capable of computing according to equation (1) but not according to equation (2); or according to equation (2) but not according to equation (1) and also according to equation (3).

Hereinafter in certain of the claims the term "combining" is used as a broad term referring to a mathematical computation upon entered terms. It is not to be construed as limited to a particular computation but may include either adding, subtracting or multiplying and/or combinations of these computations. Specifically the present machine provides for merging two terms by either adding or subtracting them and multiplying the sum or difference by a third term. The term "combining" however, is used as a broad term and is not to be construed as limited to such a specific type of calculation.

What we claim is:

1. An accounting machine with record handling devices, multiplying devices, factor set-up devices for controlling the operation of the multiplying devices, means operable automatically by the operation of the machine for deriving and algebraically adding two amounts from a record and entering the result amount upon one factor set-up device, means for entering another amount from the same record in which the two amounts were derived upon the other factor set-up device, and automatic means for thereafter bringing the multiplying devices into operation to produce a product of the factors.

2. An accounting machine including means for automatically entering and algebraically adding two numbers thereinto and for automatically entering another number thereinto, and means cooperating with and controlled by both of the foregoing means for multiplying the result of the algebraic addition by the said other number.

3. An accounting machine including in combination means for automatically entering and algebraically adding two numbers and for automatically entering another number, means cooperating with and controlled by the foregoing means for multiplying the result of the algebraic addition by the said other number, and means controlled by the last mentioned means for recording the product.

4. In an accounting machine including record handling means to pass a number of separate records in succession through the machine, means for reading a number of separate amounts from each record, means for algebraically adding some of the numbers thus read from a single record to form a factor of a to be performed computation, means for multiplying this factor by another entered number derived from the same record, said other number forming the other factor of the to be performed computation, and means for automatically operating the aforesaid means for each record handled by the record handling means, and repeating such operation for each separate record.

5. The invention set forth in claim 4 in which clearing and re-setting means are provided for clearing various sections of the machine successively to provide for overlapping cycles in the machine and for clearing another section of the machine after a computation has been made from a given record so that it is in condition to receive and perform a new computation upon the next succeeding record.

6. A record controlled and record making accounting machine, means including sensing means for reading and entering means for entering into the machine a plurality of numbers from each record, means for algebraically adding some of the numbers from each record, means for multiplying the result by another of the numbers read from the same record and for setting up a product, and means controlled by the product setup means of the last mentioned means for recording the result of the computation upon the record from which the numbers were originally read.

7. A record controlled accounting machine including means for successively passing a series of separate records in succession through the machine, means for reading and entering in the machine a plurality of numbers from each record as it passes through the machine, means for algebraically adding some of the numbers from each record, means for multiplying the result by another of the numbers read from the same record and for setting up a product, and means controlled by the product setup means of the last mentioned means for recording upon each record the result of the computation of the data appearing on that record.

8. A record controlled and record making accounting machine, and means for reading separate numbers from each record, means in the machine for optionally setting the machine to enter the sum or difference of two numbers from a single record into the machine, means for multiplying the sum or difference by another number derived by the machine from the same record, and means controlled by the aforesaid means for recording the result upon the same record.

9. An accounting machine with means for automatically handling and passing a succession of records therethrough, means for reading two numbers from the same record as it is passed through the machine, selectively settable means for adding or subtracting the numbers thus read from the same record, means for entering another number from the record into the machine, means for multiplying such entered number by the added or subtracted result previously obtained by the last mentioned means, said last mentioned means including product setup means and means controlled by the product setup means of the aforesaid means for recording the final result upon the record from which the two numbers were read by the machine.

10. A record controlled accounting machine including record handling means for automatically passing a succession of separate records through the machine, record reading means for reading a number of distinct amounts from each record as such record passes through the machine, said numbers which are read from each record comprising at least two numbers which are to be algebraically added together and a second number which is to be multiplied by the result of the algebraic addition, means in the machine controlled by the aforesaid reading means for algebraically adding two numbers from each record and for setting up the result, means controlled by the reading means for setting up another number derived from the same record, multiplying devices automatically brought into operation by the operation of the machine for multiplying the result set up number by the other set up number and including means for setting up the product thereof, and means controlled by the aforesaid product setup means for recording the product upon each record which pertains to the original data appearing thereon.

11. A record controlled accounting machine including means for reading a number of separate amounts from each of a series of records which are passed through the machine, means for algebraically adding numbers read from each record and for setting up the result as one factor of a to be performed computation, means for setting up as the other factor another amount read from the same record, and means for multiplying the set up factors together and entering the product back upon the record from which the original related and to be computed data was derived.

12. An accounting machine including record handling means for successively passing a series of records through the machine, means for reading from each record two numbers and another number and for entering said numbers into the machine, means operable automatically by the operation of the machine and under the control of the entering means of the aforesaid means for algebraically adding the first two numbers and for setting up the result of the algebraic addition in the machine, and means controlled by the entering means for the other number entered into the machine and by the means upon which the result of the algebraic addition is set up for multiplying the result of the algebraic addition by the other number entered from a record.

13. An accounting machine including record handling means for passing a series of records through the machine, means for reading from each record two numbers and another number and for entering said numbers into entry receiving means, means operable automatically under the control of the entry receiving means for the two numbers for adding such numbers together and setting up in one of said entry receiving means the sum thereof, and means controlled by the entry receiving means for the other number and by the means upon which the sum is set up for multiplying the other number obtained from the record by the said sum.

14. A accounting machine including record handling means for passing a series of records through the machine, means for reading from each record two numbers and another number and for entering said numbers into entry receiving means, means operable automatically under the control of the entry receiving means for the two numbers for subtracting such two numbers one from the other and setting up in one of said entry receiving means the difference thereof, and means controlled by the entry receiving means for the other number and by the means upon which the difference is set up for multiplying the other number which is obtained from the record by the said difference.

15. A record controlled calculating machine with a record reading and card handling mechanism for successively reading off data punched in a card and which data is representative of the factors of a to be performed computation, means for effecting a computing operation of the read in data as other data is read and for setting up the product, and means controlled by the means upon which the product is set up for punching back the product upon the record from which the factors have been derived.

16. An accounting machine with devices for automatically entering into the machine from a controlling record three terms of a to be performed computation, algebraic adding and multiplying means for obtaining an algebraically added and multiplied final result which is made up of all the entered terms, means for setting up such result in the machine, and means controlled by said last mentioned means for recording the result upon the record from which the terms were derived.

17. A record controlled and record making accounting machine including record punching mechanism, record reading devices, record handling devices for presenting a record to the record reading devices and then to the record punching mechanism, means controlled by a portion of the record reading means for entering amount data derived from a record into entry receiving devices, means for converting such read in amount into a complementary quantity, means for receiving the complementary quantity, means for setting up a one multiplier factor and means for multiplying such complemental quantity by one and for also setting up such quantity multiplied by one in a retaining means from which it may be subsequently read out, and means for controlling the record punching device from the means upon which the complementary quantity is retained so that the punching device punches back upon the record the complementary value of an amount which was derived from the record.

18. A record controlled and record making accounting machine with means for entering a number from a record, means for setting up the entered number, means controlled by the said set up means for converting the entered number into a complement, means for receiving such complement, means receiving a one entry, and means for multiplying such complemental quantity by one and for also setting up such quantity multiplied by one in a retaining means from which it may be subsequently read out, a perforating device, and means controlled from the means upon which the complement is retained for controlling the perforating devices to cause the latter to perforate upon the record from which the original amount was derived the complement of such amount.

JAMES W. BRYCE.
GEORGE F. DALY.